United States Patent [19]
Wakeland

[11] Patent Number: 5,185,655
[45] Date of Patent: Feb. 9, 1993

[54] METHOD AND APPARATUS FOR ENCODING FULL COLOR VIDEO DATA SIGNALS AND PROTOCOL FOR ENCODING SAME

[75] Inventor: Carl K. Wakeland, Bedford, Tex.

[73] Assignee: Tandy Corporation, Fort Worth, Tex.

[21] Appl. No.: 770,544

[22] Filed: Oct. 2, 1991

[51] Int. Cl.$^5$ ............................................. H04N 11/06
[52] U.S. Cl. ..................................... 358/13; 358/138; 358/133
[58] Field of Search ................... 358/13, 138, 135, 133

[56] References Cited

U.S. PATENT DOCUMENTS

| | | |
|---|---|---|
| 4,672,427 | 6/1987 | Rzeszewski ........................... 358/13 |
| 4,716,453 | 12/1987 | Pawalski ................................ 358/13 |
| 4,785,349 | 11/1988 | Keith et al. . | 
| 4,857,992 | 8/1989 | Richards ................................ 358/13 |
| 4,868,653 | 9/1989 | Golin et al. . |
| 4,953,196 | 8/1990 | Ishikawa et al. . |
| 5,003,377 | 3/1991 | Lippman et al. . |
| 5,067,010 | 11/1991 | Ishii et al. ............................... 358/13 |

OTHER PUBLICATIONS

Baran, Putting the Squeeze on Graphics, *Byte* (Dec. 1990), p. 289.
Lippman, HDTV Sparks a Digital Revolution, *Byte* (Dec. 1990), p. 297.
Kliewer, VGA to the Max, *Byte* (Dec. 1990), p. 355.

*Primary Examiner*—Victor R. Kostak
*Attorney, Agent, or Firm*—David L. McCombs; Michael S. Bush; Keith Hargrove

[57] ABSTRACT

Method and apparatus for encoding full color video data signals and a protocol for encoding the same in a storage medium. Each pixel of a full color video image is converted into a single 8 bit luminance and multiple 8 bit chrominance components. The 8 bit luminance component is differentially compressed into 5 bits while the chrominance components are subsampled for every four pixels of the video image before being differentially compressed. The differentially compressed subsampled chrominance components and the differentially compressed luminance components are then assembled into a video data signal related to the full color image.

13 Claims, 3 Drawing Sheets

METHOD AND APPARATUS FOR ENCODING FULL COLOR VIDEO DATA SIGNALS AND PROTOCOL FOR ENCODING SAME

CROSS REFERENCE TO RELATED APPLICATION

This application is related to U.S. patent application Ser. No. 07/771,310 filed on even date herewith, assigned to the assignee of the present application and hereby incorporated by reference as if reproduced in its entirety.

BACKGROUND OF THE INVENTION

1. Field of the Invention

This invention is related to video signal processing techniques and, more particularly, to a method and apparatus for encoding video color data signals.

2. Description of Related Art

The capability of displaying full-color, 24-bit images on high-resolution monitors has, in recent years, become increasingly in demand, particularly in multimedia and scientific visualization applications. However, full-color, 24-bit images require enormous amounts of storage space which, in turn, increases the cost of such imaging systems considerably. For example, a single full-color, 24-bit image on a high resolution display can often require as much as 3-4 Mbytes of data. In contrast, a single gray-scale image typically requires 1 Mbytes of data and a single black-and-white image typically requires only 125 Kbytes of data. These storage requirements are particularly problematic in animated graphic and/or full motion video applications. Animated graphic applications require the storage and display of hundreds of screen images in sequence. Full-motion color video applications, on the other hand, requires the display of 30 frames, each demanding approximately 1 Mbyte of storage space, per second. Thus, one minute of full motion color video will require a storage capacity of almost 2 Gigabytes.

Even assuming that sufficient storage capacity is available, data transfer rates pose yet another obstacle to widespread use of full color video imaging systems. Most desktop computers fall well short of the 30 Mbps data transfer rate required for full-motion color video applications. For example, the hard disk drives commonly found in many desktop computers have data transfer rates of 1 to 2 MBps. Furthermore, the data buses most commonly associated with such computer systems also tend to transfer data at rates under 20 MBps. For example, the AT bus drive runs at 8 MBps.

The CD has long been viewed as the solution to the storage requirements for full-motion color video applications. CD-ROM drives, however, tend to transfer data at rates slower than hard disk drives. Thus, while the much larger storage space of the CD is capable of addressing one problem with full-motion color video applications, the relatively slow CD-ROM drive remains an obstacle.

The solution to these problems is the use of data compression to reduce the size of the data required to represent a graphic image. In the past, data compression has been widely used for achieving and transmitting text files and various data compression algorithms have been designed for this purpose. The use of compression techniques for image data, on the other hand, have been less frequent. For compressing either text or image data file, the principle is the same—reduce the data to an abbreviated or shorthand form that retains the basic information contained in the file. Often, data compression involves identifying redundant or unnecessary information and substituting an abbreviation or shorthand symbol for that information.

The basic component of an image is the pixel and most image compression techniques address the visual attributes (color and transparency) attached to each pixel of an image. Because images generally have regions of uniform color or pattern, most commonly in the background, it is possible to represent the visual attributes of these regions using much less data information than that required to separately represent each individual pixel in that region. For this reason, many image compression schemes are directed towards dividing an image into various regions for individually encoding the visual attributes of the regions. For example, in U.S. Pat. No. 4,785,349 to Keith et al., each image is divided into a plurality of coded regions, each being encoded by a region descriptive code conveying data representative of the size and location of the regions within the image and a region fill code conveying pixel amplitude information for the regions. The region descriptive codes and fill codes are grouped together according to type and are variable length encoded according to their statistical distributions in a data stream. Separate variable length decoding of individual segments of the data stream is performed by multiple variable length decoders responsive to statistical information in the stream. Similarly, U.S. Pat. No. 4,868,653 to Golin et al. divides a frame of a digital video signal into a plurality of regions, each of which is separately analyzed and encoded by a selected one of several compression procedures to provide an optimum coding specific to the characteristics of the region being coded.

It has often been recognized that, in generating a high quality image, certain components of the data information for the image are less important than the data information of other components of the image. One way that this concept has been exploited has been to add additional information to full color video signals. For example, U.S. Pat. No. 5,300,377 to Lipmann et al. discloses an extended definition television system which generated chrominance data information at a fraction of the frame rate and using the additional channel space for encoded additional luminance data information. Similarly, many image compression schemes are also based upon the concept that, in maintaining a high quality image, certain types of data information are less important than other types of data information. In an extreme case, it is sometimes possible to discard portions of the data information altogether when compressing an image without negatively impacting the quality of the image. For example, some of the data information may be related to a portion of the image not visible to the human eye and may, therefore, be readily discarded. In other, less extreme cases, image compression schemes selectively compress various components of the image. For example, U.S. Pat. No. 4,953,196 to Ishikawa et al. discloses a compression method used for transmitting color video images over phone lines. Here, a digital RGB signal is converted into a luminance (or "Y") signal and a pair of color difference signals referred to as "I" and "Q" signals. Differential pulse code modulation (or "DPCM") is used to compress and encode the Y signal and, taking into account the visual characteristics of the I and Q signals, the color difference signals are thinned out by selectively discarding certain color difference signals.

Another data information compression scheme utilizes a 4:2:2 YUV compression ratio during the encoding process. The Y (or "luminance") signal is encoded in 8 bits per pixel. Before encoding the U ("blue-green axis") and V ("red-green axis") signals in 8 bits per pixel as well, the U and V signals are low-pass filtered and subsampled so that the encoded signal represents the chrominance values averaged over two pixels. A similar data information compression scheme also subsamples the U and V signals at a 2:1 ratio but encodes each of the Y, subsampled U and subsampled V signals in 4 bits per pixel value in four bits, also subsampling the U and V values at a 2:1 ratio.

SUMMARY OF THE INVENTION

In one embodiment, the present invention is of a method for encoding video data relating to a full color image. Each pixel of a full color video image is converted into single 8 bit luminance and multiple 8 bit twos-complement chrominance components. The 8 bit luminance component is differentially compressed into 5 bits while the chrominance components are subsampled for every four pixels of the video image before being differentially compressed. The differentially compressed subsampled chrominance components and the differentially compressed luminance components are then assembled into a video data signal related to the full color image. In one aspect of this embodiment of the invention, the differentially compressed components are adjusted based upon a comparison between running sums of the original difference values and restored compressed difference values. In another aspect of this embodiment of the invention, the position of a principal color transition is identified from the chrominance components of the full color image and appended to the assembled video data signal.

In another embodiment, the present invention is of an apparatus for encoding a full color video image comprised of a plurality of pixel elements. The video image encoder includes means for converting each pixel element of the full color video image into 8 bit luminance and 8 bit twos-complement chrominance components, means for subsampling the chrominance components of the pixel elements, means for differentially compressing the luminance components and the subsampled chrominance components and a multiplexing means for assembling an encoded video data signal from the differentially compressed luminance components and the differentially compressed subsampled chrominance components. In other aspects of this embodiment of the invention, the differentially compressed subsampled chrominance components are determined by calculating chrominance difference values for every sequence of four pixel elements and compressing the chrominance difference values from 9 bit twos-complement to 5 bits and the differentially compressed luminance components are determined by calculating a 9 bit difference value between luminance components for sequential pixel elements and compressing the difference value from 9 to 5 bits.

In still yet another embodiment, the present invention is of a protocol for encoding video data signals related to a full color image in a storage medium. The protocol includes means for converting video data signals related to color levels for a full color image into luminance and chrominance components, means for differentially compressing the luminance components and subsampled chrominance components, respectively, of the full color image and means for encoding, in a storage medium, a video data signal which includes a first field related to the differentially compressed luminance component, a second field related to the differentially compressed subsampled chrominance component and a third field related to the position of principal color transition for the full color image.

BRIEF DESCRIPTION OF THE DRAWINGS

The present invention may be better understood, and its numerous objects, features and advantages will become apparent to those skilled in the art by reference to the accompanying drawings in which:

FIG. 4 is a block diagram of a differential encoder schematic of a differential encoder included as part of the video color encoding system of FIG. 2.

DETAILED DESCRIPTION OF A PREFERRED EMBODIMENT

Figure 1:
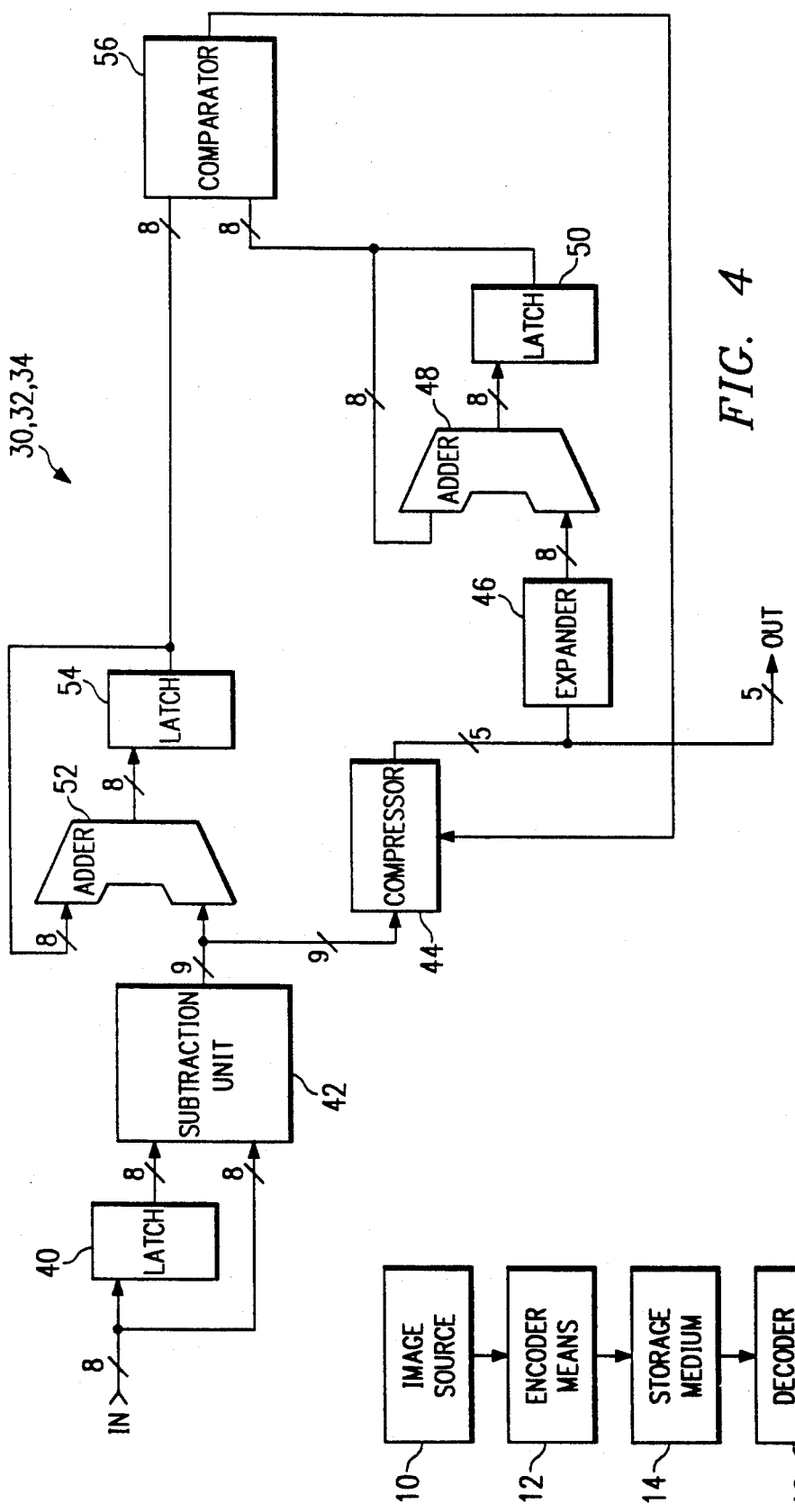
FIG. 1 is a block diagram of an image transmission system having a video color encoding system constructed in accordance with the teachings of the present invention.

Referring first to FIG. 1, an image transmission system having a video color encoding system constructed in accordance with the teachings of the present invention shall now be described in greater detail. In the preferred embodiment, the image transmission system includes an image source 10 for providing a full motion color digital video signal, either from a television broadcast signal, directly coupled video camera or other image source, although it is fully contemplated that, in alternate embodiments of the invention, the image source 10 may provide a still color digital video signal from a still photography system or other image source configured to generate or transmit a color digital video signal. Furthermore, while it is preferred that the image source 10 should provide a color digital video signal, it is also contemplated that the image source 10 may be selected such that an analog video signal shall be provided, in which case, an analog-to-digital converter should be included as part of the image transmission system subject of the present invention.

The image source 10 transmits the full motion color video signal to a color video encoder 12 which, in accordance with the teachings of the present invention, processes the full motion color video signal utilizing a differential compression technique more fully described below which reduces the memory space required to store the full motion color video image, and transmits the processed color video signal to a storage medium 14. For example, the storage medium 14 may be a compact disc read only memory (or "CD-ROM") onto which the processed color video image is recorded. At any time thereafter, the processed color video image may be retrieved from the storage medium 14 in a form substantially identical to that which it was recorded thereto, for example, using a conventional CD-ROM drive (not shown) and transmitted to a video color decoder 16. The video color decoder 16, which is described in detail in co-pending U.S. patent application Ser. No. 07/771,310 decompresses the retrieved video color signal to produce a full motion video color signal substantially identical to that originally produced by the image source 10. In turn, the decompressed video color signal is transmitted to display means 20 which may be, for example, a television receiver, computer monitor or other imaging device, for display.

Figure 2:
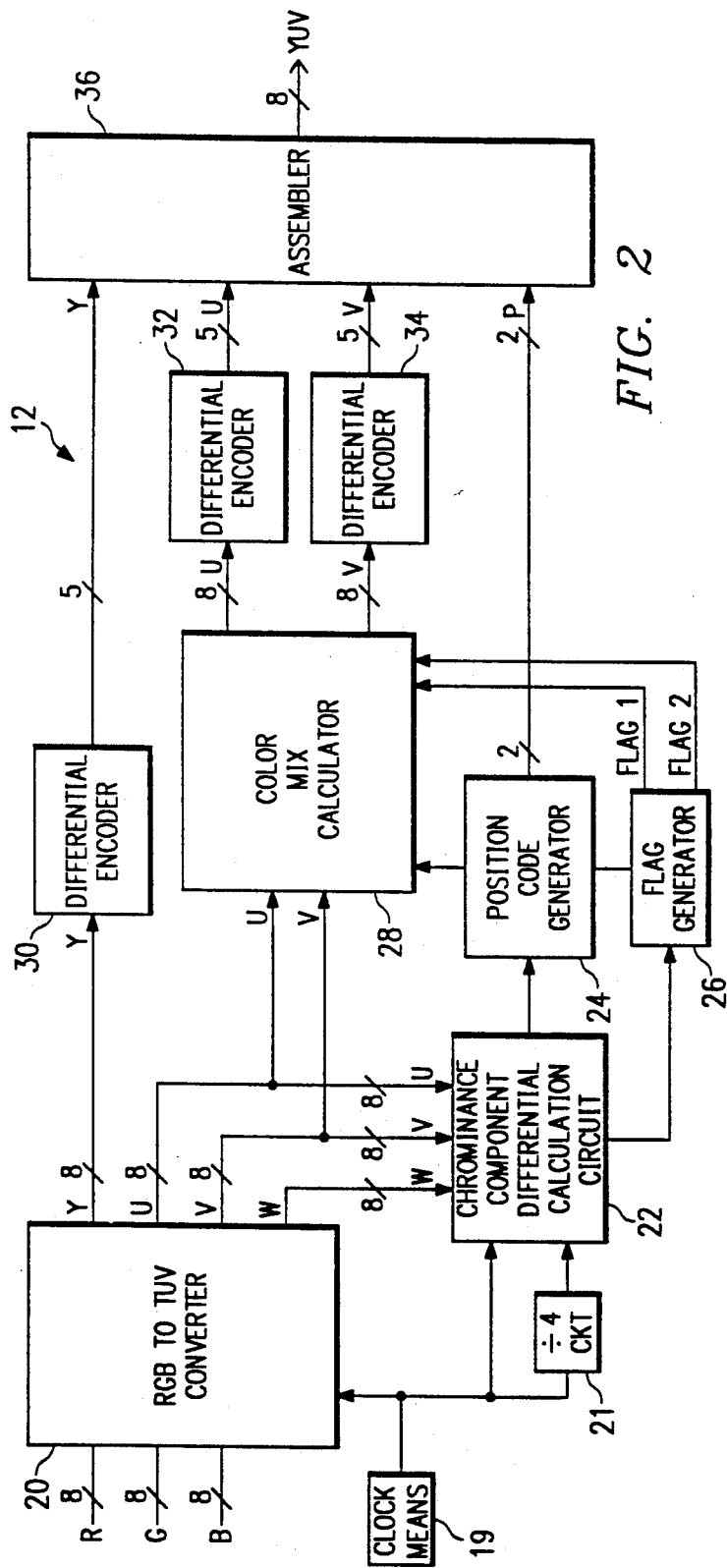
FIG. 2 is a block diagram of the video color encoding system of FIG. 1.

Referring next to FIG. 2, the full motion video color encoder 12 shall now be described in greater detail. The encoder 12 receives a video color data signal comprised of a series of signals, each signal having a component corresponding to a digitally encoded level of red, green and blue for a pixel element (or "PEL") of an image. More specifically, each video color data signal is a 24 bit signal comprised of 8 bit red, green and blue components appended in sequence and all corresponding to a single PEL of the image. Clock means 19 sequentially propagates each 24 bit video color data signal into an RGB to YUV converter 20 where the digitally encoded red, green and blue levels for a PEL are converted to YUV encoded data information. In this regard, the "Y" component represents the luminance for the PEL, the "U" component represents the difference in luminance versus red for the PEL and is a first chrominance component, the "V" component represents the difference in luminance versus blue for the PEL and is a second chrominance component and the "W" component represents the difference in luminance versus green for the PEL and is a third chrominance component. The RGB to YUV converter 20 converts the RGB levels into the aforementioned luminance and chrominance components in accordance with the following relationships:

$$Y = 0.299R + 0.587G + 0.114B \tag{1}$$

$$U = 0.564 (B - Y) \tag{2}$$

$$V = 0.713 (R - Y) \tag{3}$$

$$W = 1.219 (G - Y) \tag{4}$$

The determined 8 bit twos-complement U, V and W chrominance components are then propagated to a chrominance component differential calculation circuit where the principal color changes for a sequence of four pixels is determined. For example, if a sequence of four pixels (PEL=0, 1, 2, 3) in a series of pixels propagated to the chrominance component differential calculation circuit 22 is as follows:

PEL ... −1 | 0 1 2 3 | 4 5 ...

... $U_{-1}$ | $U_0$ $U_1$ $U_2$ $U_3$ | $U_4$ $U_5$ ...

... $V_{-1}$ | $V_0$ $V_1$ $V_2$ $V_3$ | $V_4$ $V_5$ ...

... $W_{-1}$ | $W_0$ $W_1$ $W_2$ $W_3$ | $W_4$ $W_5$ ...

The differences between the chrominance components $U_n$, $V_n$ and $W_n$ of a PEL and the chrominance components $U_{n-1}$, $V_{n-1}$ and $W_{n-1}$ of the previous PEL would then be determined to be:

$U_0 - U_{-1}$   $V_0 - V_{-1}$   $W_0 - W_{-1}$
$U_1 - U_0$     $V_1 - V_0$     $W_1 - W_0$
$U_2 - U_1$     $V_2 - V_1$     $W_2 - W_1$
$U_3 - U_2$     $V_3 - V_2$     $W_3 - W_2$
$U_4 - U_3$     $V_4 - V_3$     $W_4 - W_3$

If the greatest value from this set of 9 bit twos-complement difference values exceeds a predetermined threshold value selected to prevent the designation of a small color change not visible to the human eye as a color transition, this value would be designated as the predominant color transition occurring within the selected sequence of four pixels. Information relating to the predominant color transition occurring within the selected sequence of four pixels would then be propagated by a divide by 4 clock circuit 21 to a position code generator 24 where a 2 bit position code corresponding to the location within the selected four pixel sequence where the predominant transition occurs. For example, a position code of 0 would be generated by the position code generator 24 if the predominant 9 bit twos-complement difference value occurs between pixels one and two of the 4 pixel sequence. Referring to the previous example, this would occur if the predominant 9 bit twos-complement difference value was either $U_1 - U_0$, $V_1 - V_0$, or $W_1 - W_0$. A position code of 1 would be generated by the position code generator 24 if the predominant 9 bit twos-complement difference value occurs between pixels two and three of the 4 pixel sequence. This would occur if the predominant 9 bit twos-complement difference value was either $U_2 - U_1$, $V_2 - V_1$, or $W_2 - W_1$. A position code of 2 would be generated by the position code generator 24 if the predominant 9 bit twos-complement difference value occurs between pixels three and four of the 4 pixel sequence. This would occur if the predominant 9 bit twos-complement difference value was either $U_3 - U_2$, $V_3 - V_2$, or $W_3 - W_2$. Lastly, a position code of 3 would be generated by the position code generator 24 if the predominant 9 bit twos-complement difference value occurs at the boundary between the 4 pixel sequences, corresponding to the predominant 9 bit twos-complement difference value as either $U_4 - U_3$, $V_4 - V_3$, $W_4 - W_3$, $U_0 - U_1$, $V_0 - V_1$, or $W_0 - W_1$. Position code 3 will also be generated if none of the 9 bit twos-complement difference values is greater than the predetermined threshold value discussed above. Alternatively, the U, V and W differences for each 4-pixel sequence may be summed as follows:

$$T_0 = (U_0 - V_1) + (V_0 - V_1) + (W_0 - W_1); \tag{5}$$

$$T_1 = (U_1 - V_0) + (V_1 - V_0) + (W_1 - W_0); \tag{6}$$

$$T_2 = (U_2 - U_1) + (V_2 - V_1) + (W_2 - W_1); \tag{7}$$

$$T_3 = (U_3 - U_2) + (V_3 - V_2) + (W_3 - W_2); \tag{8}$$

$$T_4 = (U_4 - U_3) + (V_4 - V_3) + (W_4 - W_3); \tag{9}$$

Figure 3:
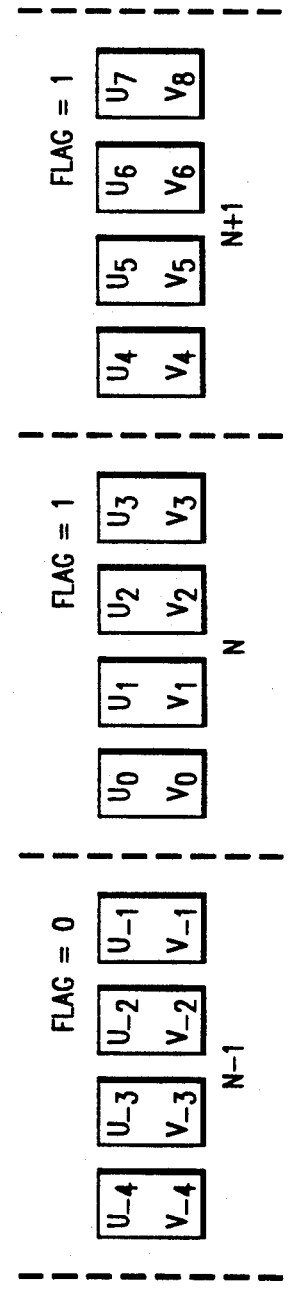
FIG. 3 is a schematic drawing which illustrates a series of pixels of video data during a subsampling process performed by the video color encoding system of FIG. 2.

As is schematically illustrated in FIG. 3, the position code of 0 would then be assigned if $T_1$ is the greatest value in the set $T_0$, $T_1$, $T_2$, $T_3$, $T_4$, and its value exceeds a predetermined threshold level. Similarly, the position code of 1 is assigned if $T_2$ is the greatest value in the aforementioned set. The position code 2 is assigned if $T_3$ is the greatest value in the set, and the position code 3 is assigned if either $T_0$ or $T_4$ is the greatest value in the set.

If $T_1$ is nearly equal or equal to $T_2$ and both values exceed a pre-determined high threshold, then the position code 1 is assigned. If $T_2$ is nearly equal to $T_3$ and both values exceed a pre-determined high threshold, then the position code 2 is assigned. If $T_1$, $T_2$ and $T_3$ all are nearly equal or equal and all exceed a pre-determined high threshold, then the position code 1 is assigned.

Returning now to FIG. 2, flag generator 26 generates two codes, or "flags", for every 4 pixel sequence. Flag 1 provides an indication as to whether a predominate change in color occurred in the selected 4 pixel sequence which should be transmitted to the next 4 pixel sequence. If no significant color change occurs within a 4 pixel sequence, and position code 3 is generated by the position code generator 24, the flag generator 26 shall set flag 1 to 0. If, on the other hand, a significant color change occurs within a 4-pixel sequence, i.e., either position code 0, 1, or 2 is generated by the position code generator 24, or if a transition value exceeding a pre-determined high threshold occurred at positions $T_0$ or $T_4$, then the flag generator 26 shall set flag 1 to 1. A second flag, designated as Flag 2, is generated by flag generator 26 and is set to 1 if one of the transition difference values $T_0$, $T_1$, $T_2$, $T_3$ or $T_4$ is greater than a predetermined limit value. This would occur if a particularly large color change occurs within that four-pixel block. If all of the transition difference values $T_0$, $T_1$, $T_2$, $T_3$ and $T_4$ are below the aforementioned predetermined limit value, then Flag 2 is set to 0.

Figure 5:
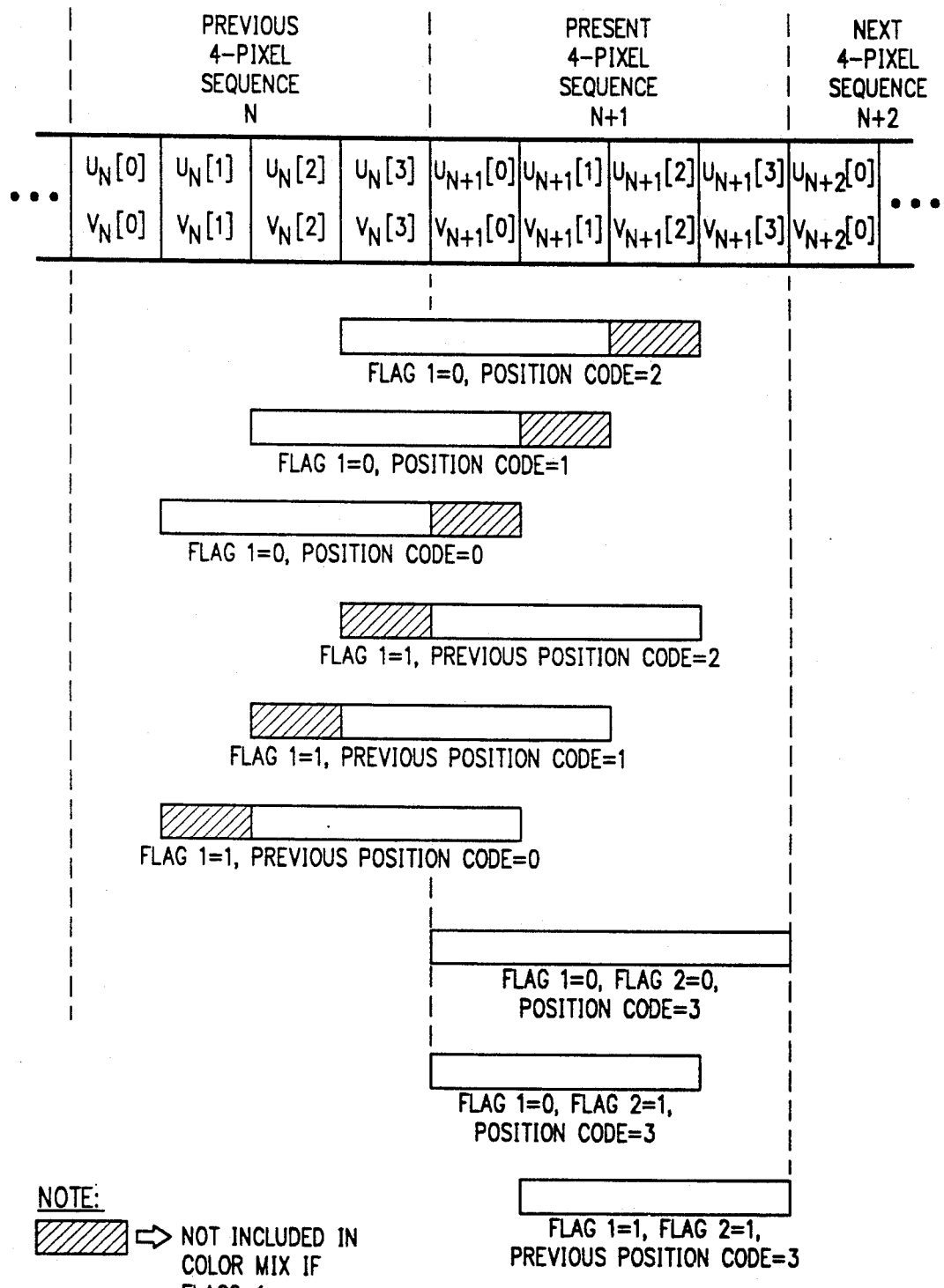
FIG. 5 is a schematic drawing which illustrates a series of pixels of video data in color mix combinations relative to the various positions and magnitudes of the principal color transitions.

The flags, position code and the 8 bit twos-complement U and V chrominance values for each PEL in a 4 pixel sequence are then clocked into a color mix calculator 28. The color mix calculator 28 determines the average color values for each four pixel sequence while the U and V chrominance values, the values from the previous 4 pixel sequence and the subsequent 4 pixel sequence are buffered. Referring to FIG. 5, if the position code for a 4 pixel sequence N+1 is either 0, 1, or 2, i.e., a predominant color transition occurs within the sequence and there was no predominant color transition in the previous sequence, then the four pixels of 8 bit twos-complement U and V values preceding the predominant transition are averaged to determine the $U_{N+1}$ and $V_{N+1}$ average color values for the N+1 4 pixel sequence. For example, referring to FIG. 5, for a position code of 2 and flag 1=0, the average color values, $U_{N+1}$ and $V_{N+1}$ would be:

$$U_{N+1}=(U_N[3]U_{N+1}[0]U_{N+1}[1]+U_{N+1}[2])/4; \quad (10)$$

$$V_{N+1}=(V_N[3]+V_{N+1}[0]+V_{N+1}[1]V_{N+1}[2])/4. \quad (11)$$

Since a change in color occurred within 4 pixel sequence N+1, flag 1 will be set to 1 to indicate to the next 4 pixel sequence, N+2, that a color transition has occurred in the previous 4 pixel sequence N+1.

If no predominant color transition occurs in the next 4-pixel sequence N+2, then the four pixels following the predominant transition would be sampled to determine the average color values, $U_{N+2}$ and $V_{N+2}$ for the subsequent 4-pixel sequence, N+2. Thus, these values would be as follows:

$$U_{N+2}=(U_{N+1}[3]U_{N+2}[0]U_{N+2}[1]+U_{N+2}[2])/4; \quad (12)$$

$$V_{N+2}=(V_{N+1}[3]+V_{N+2}[0]+V_{N+2}+[1]+V_{N+2}[2])/4. \quad (13)$$

If another predominant color transition occurs in the next 4 pixel sequence, N+2, the process is repeated; however, the color mix calculator 28 will first determine if a predominant color transition occurred in the previous 4-pixel sequence, N+1 based upon flag 1. If flag 1 is set to 1, then a predominant color transition did occur in the previous 4 pixel sequence, N+1 and, under these conditions, the color mix calculator 28 will not average the color values for the four PEL preceding the transition found in N+2 giving $U_{N+2}$ and $V_{N+2}$, as this would conflict with the transition already found in the previous sequence, N+1. The color mix calculator 8 will only mix the next four PEL which follow the transition found in the previous sequence to obtain the average color values, $U_{N+2}$ and $V_{N+2}$, to be assigned to the 4-pixel sequence, N+2. Flag 1 is then reset to 0.

If a predominant color transition had not occurred in the previous 4 pixel sequence N+1, the flag had been set to 0, and the position code for N+2 was 0, 1, or 2, then the color mix calculator 28 will average the color values for the four PEL preceding the transition point found in N+2 to obtain the values $U_{N+2}$ and $V_{N+2}$.

If a predominant color transition had not occurred in the previous 4 pixel sequence N+1, flag 1 had been set to 0 and the position code has a value of 3 then the color mix calculator 28 will average the four PELs of the 4-pixel sequence to obtain the color values $U_{N+2}$ and $V_{N+2}$.

Flag 2, which originates in flag generator 26, influences the color mix calculator 28 in the following manner: If flag 2 is set to 1, indicating that a color transition occurred which exceeded a pre-determined high threshold level, and a position code of 0, 1, or 2 was generated for the four-pixel sequence N+1, the average color values $U_{N+1}$ and $V_{N+1}$ will be calculated as already described, with the exception that the pixel nearest to the transition will not be included in the calculation. Similarly, in the color mix calculation for the four-pixel sequence N+2, the pixel nearest to the color transition occurring in sequence N+1 will not be used in the color mix calculation. If no predominant transition which exceeds the predetermined high threshold occurs in sequence N+1, flag 2 will be reset to 0. If, however, a predominant color transition does Occur which exceeds the predetermined high threshold, flag 2 will remain set to 1 through the following four-pixel sequence N+2.

If transition difference value T4, referenced to four-pixel sequence N+1, exceeds the predetermined high threshold and the assigned position code for the four-pixel sequence N+1 is 3, then the average color values will be calculated in accordance with the following:

$$U_{N+1}=(U_{N+1}[0]+U_{N+1}[1]+U_{N+1}[2])/3; \quad (14)$$

$$V_{N+1}=(V_{N+1}[0]V_{N+1}[1]V_{N+1}[2])/3. \quad (15)$$

The mix calculation for the following pixel sequence N+2 will then be calculated in accordance with the following:

$$U_{N+2}=(U_{N+2}[1]+U_{N+2}[2]+U_{N+2}[3])/3; \quad (16)$$

$$V_{N+2}=(V_{N+2}[1]+V_{N+2}[2]+V_{N+2}[3])/3. \quad (17)$$

Referring momentarily to FIG. 5, the shaded areas for the various mix calculation ranges designate those pixels which, as already described, will not be included in the color mix calculations for $U_{N+1}$ and $V_{N+1}$ when Flag 2 is set to 1.

Returning now to FIG. 2, the 8 bit Y luminance component is transmitted from the RGB to YUV converter 20 and the subsampled 9 bit twos-complement U and V chrominance components are transmitted from the color mix calculator 28 to differential encoders 30, 32 and 34, respectively, for differential compression to 5 bit values. Once differentially compressed as five bit values, the Y, U and V components are propagated, along with the two bit position code P generated by the position code generator 24, to an assembler 36 for multiplexing as a differentially compressed encoded video signal which corresponds to the full color video image.

Referring next to FIG. 4, the differential compression of the 8 bit Y, U and V components of the signal compressed by the differential encoders 30, 32, 34, respectively, shall now be described in greater detail. In this regard, it should be clearly understood that the differential compression Of the 8 bit Y, U, and V components of the signal are separately performed in accordance with the below description of the differential compression of a single 8 bit component. As to be more fully described below, a series Of 8 bit components are sequentially pipe-lined through the differential encoder 32. A first 8 bit component is supplied to a latch 40, for example a D-type flip-flop, which latches the component and a subtraction unit 42 which processes the component and propagates it through the encoder 30. A next 8 bit component is then supplied to the subtraction unit 42 and the latch 40, which, in turn, propagates the first 8 bit component to the subtraction unit 42 where the difference between the first 8 bit component and the successive 8 bit component is determined.

The 9 bit difference value determined by subtracting the successive 8 bit component from the first 8 bit component is propagated to both a compressor 44 and an adder 52. The compressor 44 compresses the input 9 bit difference value into a 5 bit value. In the preferred embodiment of the invention, the compressor 44 is comprised of a series of software instructions configured to effect actuation of the relational table set forth below although, in an alternate embodiment of the invention, it is contemplated that the compressor 44 may be comprised of a series of combinatorial logic gates designed to effect actuation of the aforementioned relational table.

TABLE I

| 9-bit Twos-Complement | 5 bit Values |
|---|---|
| 0 | 0 |
| 1 or −255 | 1 |
| 2 or −254 | 2 |
| 3 or −253 | 3 |
| 4 or −252 | 4 |
| 5 or −251 | 5 |
| 6...7 or −250...−249 | 6 |
| 8...10 or −248...−246 | 7 |
| 11...14 or −245...−242 | 8 |
| 15...19 or −241...−237 | 9 |
| 20...25 or −236...−231 | 10 |
| 26...33 or −230...−223 | 11 |
| 34...43 or −222...−213 | 12 |
| 44...56 or −212...−200 | 13 |
| 57...76 or −199...−180 | 14 |
| 77...106 or −179...−150 | 15 |
| 107...149 or −149...−107 | 16 |
| 150...179 or −106...77 | 17 |

TABLE I-continued

| 9-bit Twos-Complement | 5 bit Values |
|---|---|
| 180...199 or −76...−57 | 18 |
| 200...212 or −56...−44 | 19 |
| 213...222 or −43...−34 | 20 |
| 223...230 or −33...−26 | 21 |
| 231...236 or −25...−20 | 22 |
| 237...241 or −19...−15 | 23 |
| 242...245 or −14...−11 | 24 |
| 246...248 or −10...−8 | 25 |
| 249...250 or −7...−6 | 26 |
| 251 or −5 | 27 |
| 252 or −4 | 28 |
| 253 or −3 | 29 |
| 254 or −2 | 30 |
| 255 or −1 | 31 |

In this manner, the compressor 44 compresses each 9 bit input value into a binary 5 bit output value. It is further contemplated that the particular configuration of the relational table is selected such that small color differentials between successive signals will be favored, i.e. will be more clearly encoded, over large color differentials between successive signals. In this manner, small color transitions that might otherwise be indistinct will be clearly imaged. To enhance the capability of encoding the smaller color differentials, selected ones of the 9 bit differential values are related to specific ones of the 5 bit differential values in a one to one correspondence while relatively large ranges of other 9 bit differential values are related to a single 5 bit differential value. The compressed 5 bit difference value produced by the compressor 44 is propagated to an expander 46 where the compressed 5 bit difference value is expanded back into a restored 8 bit difference value, using the relational values set forth in Table II.

TABLE II

| 5 bit Values | 8 bit Values |
|---|---|
| 0 | 0 |
| 1 | 1 |
| 2 | 2 |
| 3 | 3 |
| 4 | 4 |
| 5 | 5 |
| 6 | 6 |
| 7 | 9 |
| 8 | 12 |
| 9 | 17 |
| 10 | 22 |
| 11 | 29 |
| 12 | 38 |
| 13 | 50 |
| 14 | 66 |
| 15 | 91 |
| 16 | 128 |
| 17 | 165 |
| 18 | 190 |
| 19 | 206 |
| 20 | 218 |
| 21 | 227 |
| 22 | 234 |
| 23 | 239 |
| 24 | 244 |
| 25 | 247 |
| 26 | 250 |
| 27 | 251 |
| 28 | 252 |
| 29 | 253 |
| 30 | 254 |
| 31 | 255 |

For those 5 bit values to which multiple 9 bit difference values corresponded in Table I, Table II selects the average of the multiple positive values corresponding to the previously selected 5 bit value. Unlike the input to the compressor 44, the output of expander 46 utilizes only 8 bits and achieves negative values by using wrap-around when computing the running sum. As before, it is preferred that the expander 46 be comprised of a series of software instructions configured to effect actuation of the inverse of the relational table although, it is again further contemplated that the expander 46 may alternately be comprised of a series of combinatorial logic gates designed to effect actuation of the aforementioned relationships.

The restored 8 bit running sum is then compared to the original 8 bit running sum. More specifically, the original 9 bit difference value and the restored 8 bit difference value are propagated to adders 52, 48, respectively. Respective latches 54, 50, which again may be, for example D-type flip-flops, connected to the output Of the adders 52, 48 are used to latch the output of the adders 52, 48 and propagate the output back to the adder 52, 48 for adding with the next original and restored difference values, respectively, thereby producing a running sum for each value. The resulting running sums of the original and restored differences are also propagated by the latches 54, 50 to a comparator 56. The comparator 56 determines the difference between the Original 8 bit running sum and the restored 8 bit running sum and, based on the difference between the two, will revise the 5 bit compressed difference value which propagates to expander 46.

More specifically, the comparator 56 will compare the running sum of the original 9 bit difference value and the running sum of the restored 8 bit difference values. If the restored running sum is higher or lower than the original running sum, the comparator will send a signal to the expander 44 to adjust the compression and expansion relationships so that later running sums will be closer in value than the compared running sums. For example, if the restored running sum is positive and less than the original running sum, the 5 bit compressed value corresponding to the 9 bit difference value will be increased and, if the restored running sum is greater than the original running sum, the 5 bit compressed value corresponding to the 9 bit difference value will be decreased. This process is repeated until the comparator 44 optimizes the 5 bit compressed difference value for a 9 bit difference value, i.e. the restored running sum is approximately equal to the original running sum, and the optimal 5 bit compressed difference value for a 9 bit difference value is output to the respective one of the differential encoders 30, 32, 34.

Thus, there has been described and illustrated herein a method and apparatus for encoding video data which combines an 8 to 5 bit compression of the luminance component with an 8 to 5 bit compression of the chrominance components subsampled over 4 pixels to produce an encoded video signal Which significantly reduces the amount of data required to represent an image while avoiding significant detriment to image quality. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. A method for encoding full color video data comprised of a series of pixel elements, said method comprising the steps of:
   converting said full color video data into luminance and chrominance components;
   subsampling said chrominance components by determining average chrominance difference values for every sequence of four pixels of said data;
   differentially compressing said subsampled chrominance components;
   differentially compressing said luminance components by determining average luminance difference values between successive pixel elements, and compressing said difference values; and
   assembling said differentially compressed subsampled chrominance components and said differentially compressed luminance components of said converted full color video data.

2. A method for encoding full color video data as set forth in claim 1 wherein said determined difference values are 9 bit values and wherein said compressing steps compress said 9 bit determined difference values to 5 bit values.

3. A method for encoding full color video data as set forth in claim 1 wherein said differentially compressing step further includes the steps of:
   compressing each determined 9 bit difference value to a 5 bit difference value;
   expanding each said compressed 5 bit difference value to an 8 bit difference value;
   summing said 9 bit determined difference values resulting in a first 8 bit running sum;
   summing said 8 bit difference values resulting in a second 8 bit running sum;
   comparing said first and second 8 bit running sums; and
   adjusting said compression of 9 bit difference values based upon said comparison of said first and second 8 bit running sums.

4. A method for encoding full color video data according to claim 1 and further comprising the steps of:
   determining the position and magnitude of a principal color transition within said sequence of four pixels of chrominance data; and
   appending the position of said principal color transition to said assembled differentially compressed subsampled chrominance components and said differentially compressed luminance components of said converted full color video data.

5. A method for encoding full color video data according to claim 4 and further comprising the steps of:
   determining first, second and third chrominance components for said video data;
   determining a maximum chrominance component differential from said first, second and third components; and
   determining the position and magnitude of said principal color transition from said maximum ohrominance component differential.

6. A method for encoding full color video data according to claim 4 and further comprising the step of selectively averaging said chrominance values based upon the position and magnitude of said principal color transition occurring within said sequence of four pixels to be differentially encoded.

7. A method for encoding full color video data according to claim 6 wherein said step of selectively averaging further includes the steps of:

averaging said chrominance values preceding said principal color transition; and averaging said chrominance values succeeding said principal color transition;

wherein said step of selective averaging does not average said chrominance values preceding said principal color transition if a principal color transition occurred in the previous sequence of four pixels but will instead average said chrominance values succeeding said principal color transition in said previous sequence of four pixels.

8. An apparatus for encoding a full color video image comprised of a plurality of pixel elements, comprising:

means for converting each pixel element of a full color video image into luminance and chrominance components;

means for subsampling said chrominance components of said plurality of pixel elements by determining average chrominance difference values for every sequence of four of said pixel elements of said data;

means for differentially compressing said luminance components;

means for differentially compressing said luminance components;

means for differentially compressing said subsampled chrominance components; and multiplexing means for assembling said encoded video data signal from said differentially compressed luminance components and said differentially compressed subsampled chrominance components.

9. An apparatus for encoding a full color video image according to claim 8 and further comprising:

means for determining a difference value for said luminance components of successive pixel elements; and means for compressing said determined difference value for said luminance components of said successive pixel elements.

10. An apparatus for encoding a full color video image according to claim 9 and further comprising:

means for determining a difference value for a first chrominance component averaged for successive pixel elements; and means for compressing said averaged chrominance difference values.

11. An apparatus for encoding a full color video image according to claim 10 and further comprising:

means for determining a difference value for a second chrominance component averaged for successive pixel elements; and means for compressing said second averaged chrominance difference values.

12. An apparatus for encoding a full color video image according to claim 11 and further comprising:

means for calculating chrominance difference values for every sequence of four of said plurality of pixel elements;

means for determining the position and magnitude of a principal color transition for four successive pixel elements; and means for generating a position code based upon said determined position of said principal color transition;

wherein said multiplexing means further comprises means for assembling said encoded video data signal from said differentially compressed luminance components, said differentially compressed subsampled chrominance components and said position code.

13. A protocol for encoding, in a storage medium, video data signals related to a full color image, comprising:

means for converting video data signals related to color levels for a full color image into luminance and chrominance components;

means for differentially compressing said luminance components of said full color image;

means for subsampling said chrominance components of said full color image;

means for differentially compressing said subsampled chrominance components; and means for encoding, in a storage medium, a video data signal which includes a first field for related to said differentially compressed luminance component, a second field related to said differentially compressed subsampled chrominance component and a third field related to the position of principal color transition for said full color image said position field determined from said chrominance components.

* * * * *